E. GIESELMANN.
CULTIVATOR.
APPLICATION FILED JUNE 22, 1910.
976,864.
Patented Nov. 29, 1910.
2 SHEETS—SHEET 1.
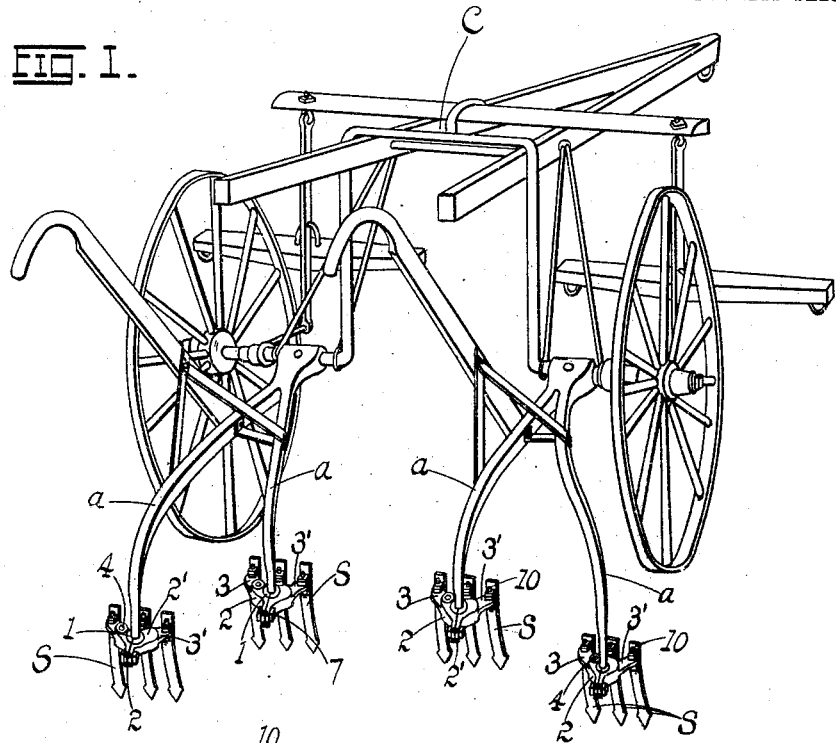
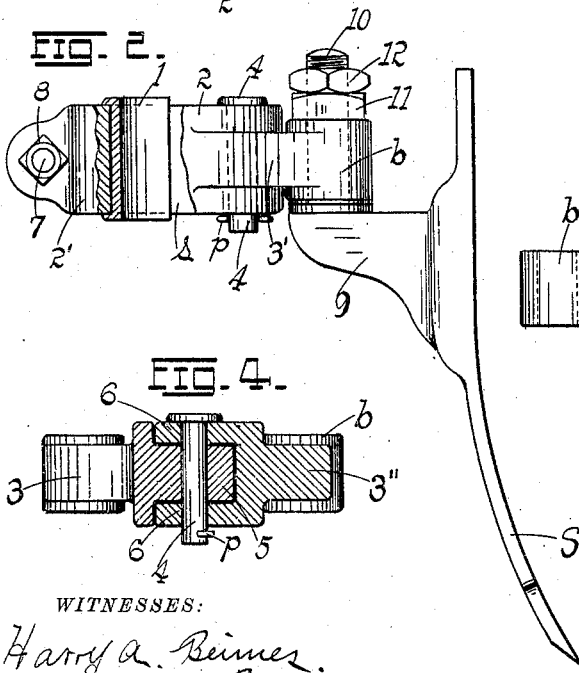
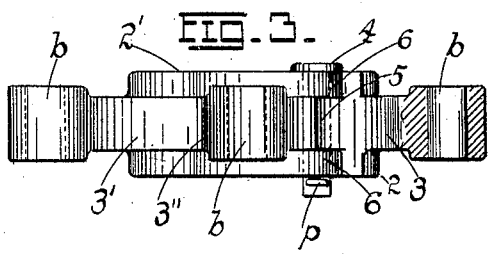
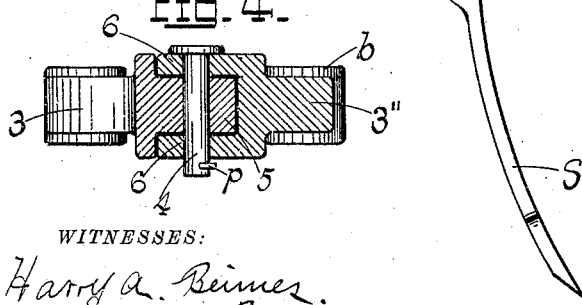
WITNESSES:
Harry A. Beimes
Alonzo W. Powell
INVENTOR.
Edward Gieselmann·
BY
ATTORNEY.

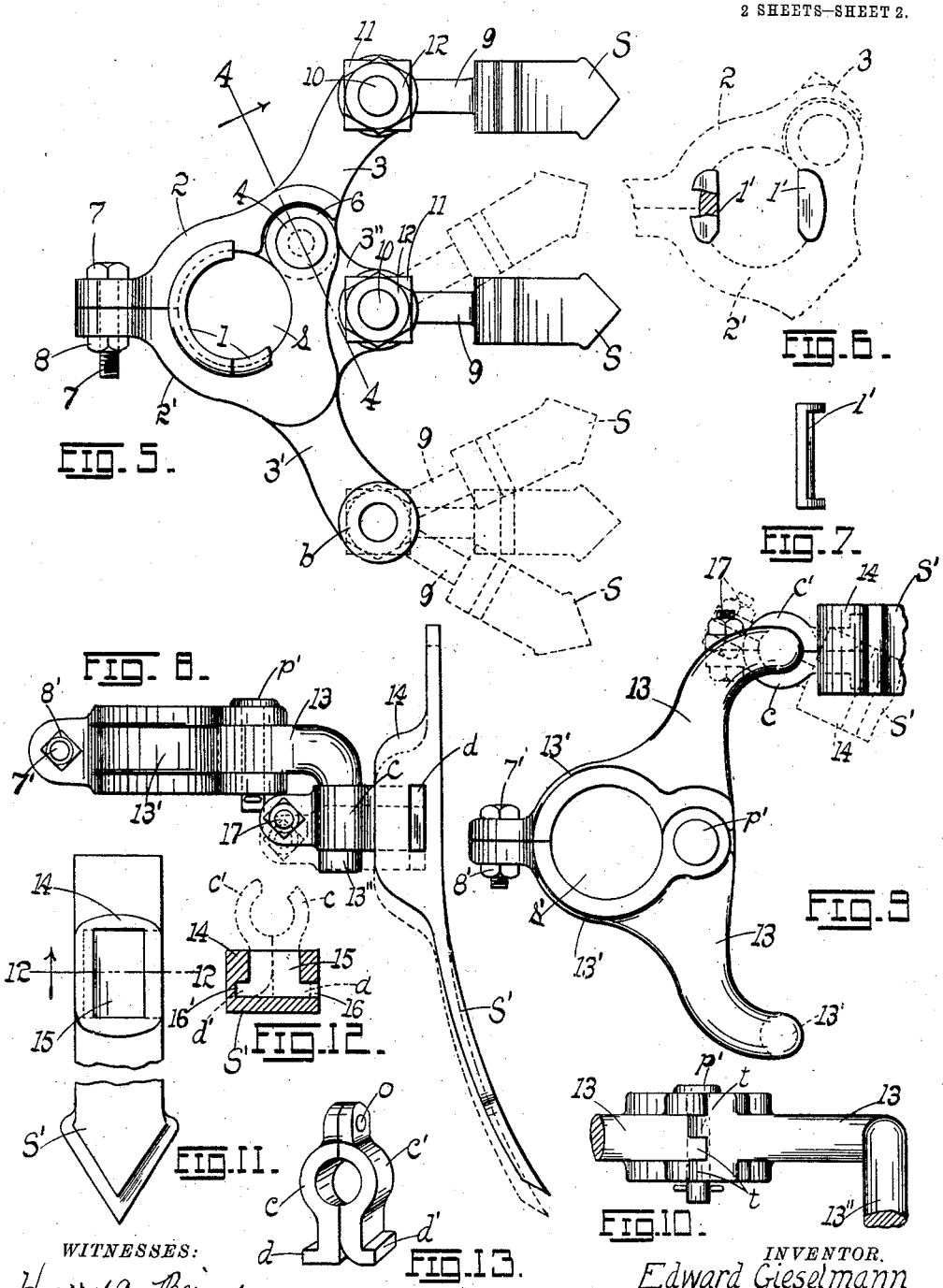

UNITED STATES PATENT OFFICE.

EDWARD GIESELMANN, OF MOUNT OLIVE, ILLINOIS, ASSIGNOR OF ONE-FOURTH TO EDWARD H. MEYER AND ONE-FOURTH TO GEORGE GIESELMANN, OF MOUNT OLIVE, ILLINOIS.

CULTIVATOR.

976,864.

Specification of Letters Patent.

Patented Nov. 29, 1910.

Application filed June 22, 1910. Serial No. 568,316.

*To all whom it may concern:*

Be it known that I, EDWARD GIESELMANN, citizen of the United States, residing at Mount Olive, in the county of Macoupin and State of Illinois, have invented certain new and useful Improvements in Cultivators, of which the following is a full, clear, and exact description, reference being had to the accompanying drawings, forming a part hereof.

My invention has relation to improvements in cultivators; and it consists in the novel details of construction more fully set forth in the specification and pointed out in the claims.

In the drawings, Figure 1 is a perspective of a conventional cultivator showing one form of my invention applied thereto; Fig. 2 is a side elevation (partly broken) illustrating one form of shovel and securing clamp therefor; Fig. 3 is a front view of the bracket-clamp with shovels removed; Fig. 4 is a sectional detail on the line 4—4 of Fig. 5; Fig. 5 is a top plan of the bracket-clamp and shovels attached; Fig. 6 is a top plan showing a modified form of bushing for the clamp; Fig. 7 is an edge view of one member of the bushing shown in Fig. 6; Fig. 8 is a side view of a modified form of bracket-clamp and shovel; Fig. 9 is a top plan of Fig. 8 with shovel broken; Fig. 10 is a front elevation of one-half of the clamp shown in Fig. 9; Fig. 11 is a rear view of the shovel shown in Fig. 8; Fig. 12 is a cross-section on the line 12—12 of Fig. 11; and Fig. 13 is a perspective of the shovel-supporting clasp or clamp adapted to be coupled to the main bracket-clamp.

The object of my invention is to provide any conventional form of cultivator with means for the support of the shovels, said supporting means having special provision for the lateral and vertical adjustments of the shovels for purposes of conforming the width and depth of cut to the character of plant under cultivation, and to the spacing of the rows of the seeds deposited in the earth.

A further object is to provide a shovel support which may accommodate various sizes of shovels; one which is susceptible of a large variety of modifications; one readily attached to or detached from the arms of the cultivator; and one possessing further and other advantages better apparent from a detailed description of the invention which is as follows:—

Referring to the drawings, and for the present to Figs. 1 to 5 inclusive, C represents a conventional cultivator provided with the usual shovel-carrying arms $a$. The lower terminal of the arm $a$ is received in a sectional bushing 1, 1, (cylindrical as shown here, where the terminal is cylindrical), the bushing sections being held in position in the socket formed by the closing of the rear arms 2, 2′, of the hinged sections of the bracket-clamp to the front arms 3, 3′, 3″, of which the shovels are directly attached. The clamp sections are hinged to a common hinge-pin 4, the pin passing loosely through the tongue 5 of the section 2, 3, and through the fork-members or lobes 6, 6, formed on the section 3, 3′, between which lobes the tongue is received (Figs. 4, 5). The pin or spindle 4 is held in place by a head at one end and a locking pin $p$ at the opposite end, a structural detail well understood in the art. The lower end of the arm $a$ is inserted into the socket $s$, or more properly speaking, into the sectional bushing 1, 1, and the members 2, 2′, tightly clamped about said arm by the screw-bolt 7, a lock-nut 8 being passed over the bolt as shown (Fig. 5). The shovels S are connected to and supported by, the arms 3, 3′, 3″, of the respective bracket-clamp sections, the short arm 3″ being identified with the section 2′, 3′, as best seen in Fig. 5.

In the first form of my invention the shovel is provided with an upper rear arm or bracket 9 from the free end of which projects upwardly a stud-bolt 10 which is inserted from the bottom through the hollow boss or socket $b$ forming the terminal of each arm 3, 3′, 3″. By this arrangement the shovels may be turned or adjusted to any angle relatively to the general line of travel of the cultivator (dotted positions Fig. 5), and when once adjusted are rigidly secured by a clamping nut 11 capped by a lock-nut 12.

Where the terminal of the arm $a$ is cylindrical, a corresponding bushing 1, 1, is employed as already described; but where the end of the arm is square in cross-section then corresponding bushing sections 1′, 1′, are employed as shown in Figs. 6 and 7. Obviously, a bushing is employed which best conforms to the cross-section of the terminal stem of the arm, this detail not being herein claimed as it is an obvious expedient.

The bracket-clamp above described (2, 3, 2', 3', 3'') is adapted to carry three shovels S, S, S, but for other class of work and with a different character of plant under cultivation I may substitute the form shown in Figs. 8 to 13 inclusive. In this modification we have a pair of hinged sections 13, 13, pivoted to a hinge-pin $p'$ and provided with interlocking tongues $t$ (and corresponding grooves) about the hinge axis, the arms terminating in the rear in curved extensions 13', 13', jointly forming a socket $s'$ and clamped about the cultivator-arm $a$ by a screw-bolt 7' and lock-nut 8', the front terminals of the arms 13, 13, proper being bent downward in the form of extensions 13''. These deflected terminals 13'' serve as the immediate carriers for the sectional clasp or clip to which the shovel S' is directly secured. The clip in question comprises a pair of straps $c$, $c'$, one end of the former terminating in a right-angular flange or tooth $d$, and the other in a more or less outwardly rounded flange or tooth $d'$. The shovel S' is provided with an upper rear enlargement or boss 14 in which is formed a pocket 15 terminating in lateral extensions 16, 16' respectively, the extension 16 being open at its outer end (Fig. 12). To attach the straps $c$, $c'$, the "square" tooth $d$ is passed into the extension or offset 16 of the socket 15, the strap having been previously inserted into the socket, after which the strap $c'$ is shoved in by properly inclining the same so as to cause the rounded back of the tooth $d'$ to ride over the back of the portion of the strap $c$ already in position, when finally the tooth $d'$ will come opposite the offset 16' and automatically slip into the same, and the operation is complete (Fig. 12). The straps $c$, $c'$, are then adjusted to the proper vertical elevation on the arms 13'' as well as to the proper angular position (Fig. 9), and by means of a clamping screw-bolt 17 passed through the alining openings $o$ of the rear ends of the straps, the parts are rigidly secured in position. It will be seen that the shovels S' are of a somewhat different formation from those shown in Figs. 1 to 5.

Having described my invention, what I claim is:—

1. In combination with a cultivator having a depending arm, a bracket composed of two hinged sections clamped thereto and provided with arms on opposite sides of the hinge axis of the sections, and shovels mounted on the arms and adjustable vertically thereon, and capable of horizontal oscillation about their axes of support.

2. In combination with a cultivator having a depending arm, a bracket-clamp composed of two hinged sections secured thereto and provided with arms disposed on opposite sides of the hinge axis of the sections, a shovel for each arm, a member on each shovel provided with a socket having lateral offsets, and a sectional clasp locked within the socket and clamped to each of the arms of the bracket-clamp.

3. In combination with a cultivator having a depending arm, a bracket-clamp composed of two hinged sections secured thereto and provided with arms on opposite sides of the hinge-axis of the sections, a shovel for each arm, a member on each shovel provided with a socket having lateral offsets, and a sectional clasp locked within the socket and clamped to each of the arms of the bracket-clamp, the said clamp being capable of an up and down adjustment and rotatable about its axis of support.

In testimony whereof I affix my signature, in presence of two witnesses.

EDWARD GIESELMANN.

Witnesses:
 EMIL STAREK,
 ALONZO W. POWELL.